US007834769B2

(12) United States Patent
Hinkle et al.

(10) Patent No.: US 7,834,769 B2
(45) Date of Patent: Nov. 16, 2010

(54) ANIMAL DETERRENT MAT

(75) Inventors: David Anthony Hinkle, Knoxville, TN (US); Albert Leon Lee, IV, Seymour, TN (US); Steven M. Schrick, Knoxville, TN (US); Duane A. Gerig, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 301 days.

(21) Appl. No.: 12/170,302

(22) Filed: Jul. 9, 2008

(65) Prior Publication Data

US 2009/0309738 A1 Dec. 17, 2009

Related U.S. Application Data

(60) Provisional application No. 61/060,997, filed on Jun. 12, 2008.

(51) Int. Cl.
*G08B 23/00* (2006.01)
(52) U.S. Cl. .................... 340/573.3; 340/541; 119/712; 119/908
(58) Field of Classification Search .............. 340/573.3, 340/541; 119/712, 720, 908; 361/232
See application file for complete search history.

(56) References Cited

U.S. PATENT DOCUMENTS

| 4,949,216 | A | 8/1990 | Djukastein |
| 5,107,620 | A | 4/1992 | Mahan |
| 6,327,999 | B1 | 12/2001 | Gerig |
| 6,817,138 | B1 | 11/2004 | McGill et al. |
| 6,925,748 | B2 | 8/2005 | McGill et al. |
| 6,993,867 | B2 | 2/2006 | Toyota |
| 7,191,735 | B2 | 3/2007 | Wolfgram |

*Primary Examiner*—George A Bugg
*Assistant Examiner*—Hongmin Fan
(74) *Attorney, Agent, or Firm*—Pitts & Brittian P.C.

(57) ABSTRACT

An animal deterrent mat with animal detection capability. The animal deterrent mat produces a detection pulse that is attenuated when an object makes contact with the animal deterrent mat. The animal deterrent mat monitors the amplitude of the detection pulse and compares the measured detection pulse amplitude to one or more threshold values. When the amplitude of the detection pulse is below an upper threshold corresponding to the attenuated signal caused by an animal making contact with the animal deterrent mat and, optionally, above lower threshold corresponding to the attenuated signal caused by another object making contact with the animal deterrent mat, such as a human, a deterrent pulse selected to deter the animal from crossing or remaining on the animal deterrent mat is generated. When the amplitude of the detection pulse is below the optional lower threshold, no deterrent stimulus is generated.

12 Claims, 3 Drawing Sheets

ANIMAL DETERRENT MAT

CROSS-REFERENCE TO RELATED APPLICATIONS

This application claims the benefit of U.S. Provisional Application No. 61/060,997 filed Jun. 12, 2008.

STATEMENT REGARDING FEDERALLY SPONSORED RESEARCH OR DEVELOPMENT

Not Applicable

BACKGROUND OF THE INVENTION

1. Field of Invention

The invention relates to an apparatus for deterring an animal from a designated area. More specifically, the invention relates to an apparatus that monitors a detection pulse applied to the mat and applies a deterrent stimulus to the mat when changes to the detection pulse indicate the presence of an animal on the mat.

2. Description of the Related Art

Many pet owners do not want their pets in particular areas, such as bedrooms, or on or near objects, such as garbage cans, furniture, and counter tops. One apparatus for deterring an animal from these areas and objects is a mat designed to apply a deterrent stimulus to an animal making contact with the mat. Prior art pet deterrent mats achieve this by continuously or substantially continuously apply a deterrent stimulus to one or more conductive elements in the mat. Because, the deterrent stimulus is "always on," these prior art deterrent mats consume significantly more energy and deplete batteries more quickly than necessary. Further, any animal, person, or object coming into contact with a prior art deterrent mat receives the deterrent stimulus without discretion.

BRIEF SUMMARY OF THE INVENTION

This summary of the animal deterrent mat with animal detection describes the scope and spirit of the present invention and is not intended to describe the features of present invention in detail or to limit the invention by what is included or excluded herein. The animal deterrent mat produces a low-voltage detection pulse that is attenuated when an object comes in contact with the animal deterrent mat. The animal deterrent mat monitors the amplitude of the detection pulse and compares the measured amplitude to one or more threshold values. When the amplitude of the detection pulse is below an upper threshold corresponding to the attenuated signal caused by an animal making contact with the animal deterrent mat and, optionally, above lower threshold corresponding to the attenuated signal caused by another object making contact with the animal deterrent mat, such as a human, a deterrent pulse selected to deter the animal from crossing or remaining on the animal deterrent mat is generated. When the amplitude of the detection pulse is below the optional lower threshold, no deterrent stimulus is generated.

In general, the animal deterrent mat includes a mat carrying two electrical conductors and a control unit. The mat is fabricated from an electrically non-conductive material. The two conductors are exposed at the top surface of the mat and electrically isolated from each other allowing one conductor to carry the detection signal and the deterrent stimulus while the other conductor is connected to ground. Further, the two conductors are separated by a distance that is small enough to allow the footpad of an animal to simultaneously make contact with both conductors.

The detection pulse has a normal amplitude when there is no load across the two conductors, i.e., when no object electrically connects the first conductor to the second conductor. When the paw of a typical household pet, such as a dog or cat, makes contact between the two conductors, attenuation reduces the amplitude of the detection pulse by approximately 5-20%. When a human makes contact between the two conductors, attenuation reduces the amplitude of detection pulse by approximately 90% or more. By monitoring the amplitude of the detection pulse and comparing the amplitude to one or more thresholds, the control unit can determine whether to generate and apply a deterrent pulse to the mat. The deterrent pulse is selected to deter an animal from crossing or remaining on the mat. When the amplitude of the attenuated signal falls below an upper threshold, which is set between the normal amplitude of the detection pulse and the attenuated amplitude of the detection pulse when an animal connects the two conductors, the control unit issues a deterrent stimulus. However, when the attenuated signal remains above the upper threshold or when the attenuated signal falls below a lower threshold, which is set between the attenuated amplitude of the detection pulse when an animal connects the two conductors and the attenuated amplitude of the detection pulse when a human connects the two conductors, no deterrent stimulus is generated. In this manner, the range of objects receiving a deterrent stimulus can be controlled. This results in reduced power consumption (i.e., longer battery life) because fewer high-voltage deterrent stimuli will be produced and fewer instances where deterrent stimulus is applied to something other than an animal that the pet owner intends to deter from an area.

The control circuit of the animal deterrent mat generally includes a dc power source, a signal generator, a logic circuit, a mat interface, a signal monitor, and an optional logic interface. The dc power source provides power to operate the control circuit and produce the deterrent stimuli. The signal generator produces both the low-voltage detection pulse used to detect when an animal steps on the mat and the deterrent pulse used to deter the animal from the area protected by the animal deterrent mat. The mat interface provides an electrical connection to the conductors carried by the mat. The signal monitor collects the voltage across the mat interface and provides it to the logic circuit for processing, either indirectly through the logic interface or directly. The optional logic interface performs any necessary conversion, conditioning, or other adjustments to make the output of the signal monitor usable by the logic circuit.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An animal deterrent mat with animal detection 100 is shown and described in detail in description that follows. The animal deterrent mat 100 produces a low-voltage detection pulse that is attenuated when an object comes in contact with the animal deterrent mat 100. The animal deterrent mat 100 monitors the amplitude of the detection pulse and compares the measured amplitude to one or more threshold values. When the amplitude of the detection pulse is below an upper threshold corresponding to the attenuated signal caused by an animal making contact with the animal deterrent mat 100 and, optionally, above lower threshold corresponding to the attenuated signal caused by another object making contact with the animal deterrent mat 100, such as a human, a deterrent pulse selected to deter the animal from crossing or remaining on the animal deterrent mat 100 is generated. When the amplitude of the detection pulse is below the optional lower threshold, no deterrent stimulus is generated.

Figure 1:
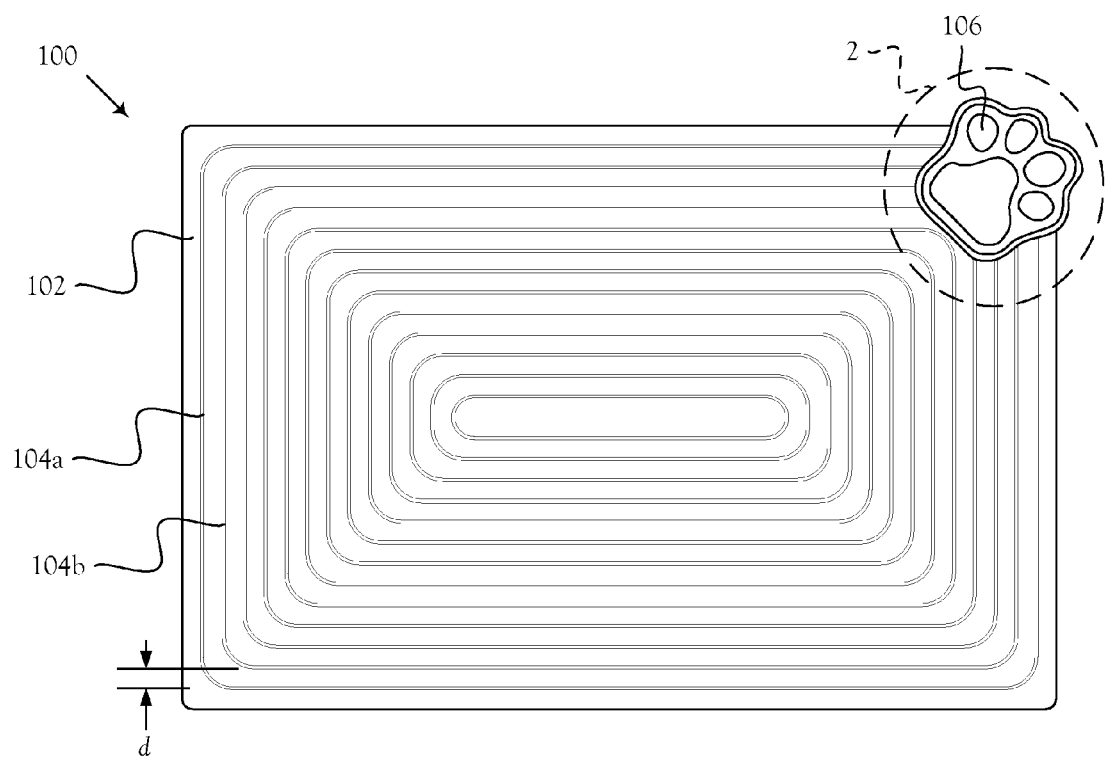
FIG. 1 is top plan view of one embodiment of the animal deterrent mat.

FIG. 1 illustrates one general embodiment of the animal deterrent mat 100. The animal deterrent mat 100 includes a mat 102 carrying two conductors 104a, 104b and a control unit 106. The mat 102 is fabricated from an electrically non-conductive material. Suitable materials for the mat 102 include various plastics, polymers, and fabrics. In one embodiment, the mat is fabricated from an electrically non-conductive material which has sufficiently flexibility so that the mat can be rolled or folded. In another embodiment, the mat is fabricated from an electrically non-conductive material with substantial rigidity allowing the mat to retain its shape. The two conductors 104a, 104b are carried by the mat 102 and exposed through the top surface of the mat 102. The two conductors 104a, 104b are arranged so that the first conductor 104a does not make electrical contact with second conductor 104b. In general, one conductor carries the detection signal and the deterrent stimulus while the other conductor is connected to ground. In the illustrated embodiment, the mat 102 is substantially rectangular and the two conductors 104a, 104b are arranged in a series substantially concentric rings; however, one skilled in the art will recognize that other shapes and arrangements can be employed without departing from the scope and spirit of the present invention. The control unit 106 attaches to the mat 102 and provides power and control functions for the animal deterrent mat 100.

In the illustrated embodiment, the two conductors 104a, 104b are arranged in alternating, concentric spirals such that each loop formed by the first conductor 104a is next to a loop formed by the second conductor 104b and separated by a distance, d, that is small enough to allow the footpad of an animal to simultaneously make contact with both the first conductor 104a and the second conductor 104b. While not illustrated, it will be understood by one skilled in the art that a separator or insulator prevents the first conductor 104a from making electrical contact with the second conductor 104b when the spirals cross. Further, one skilled in the art will appreciate that the two conductors may be configured in other arrangements, such as a grid or crisscross pattern, as long as the first conductor is next to the second conductor and the spacing between the two conductors remains close enough to allow the footpad of the animal to make contact with both conductors at the same time. With regard to the conductor configuration, in one embodiment, the conductors are preformed from a rigid or semi-rigid conductive material. In an alternate embodiment, the conductors are a flexible conductive material that is arranged at the time the mat is fabricated.

Various techniques are available for forming the mat 102 including molding the mat in one or more layers and weaving the mat from a fabric. Other suitable techniques will be appreciated by one skilled in the art. The conductors are joined with the mat using any number of techniques depending upon the construction of the mat. In one embodiment, the conductors are molded into the mat with a portion of each conductor exposed through the top surface of the mat. In another embodiment, the conductors are affixed to the surface of the mat using a chemical or thermal bond. In yet another embodiment, the conductors are woven into the mat. In a still further embodiment, multiple electrically conductive sheets separated by insulating sheets exposing portions of the conductive sheets to provide alternating conductors.

Figure 2:
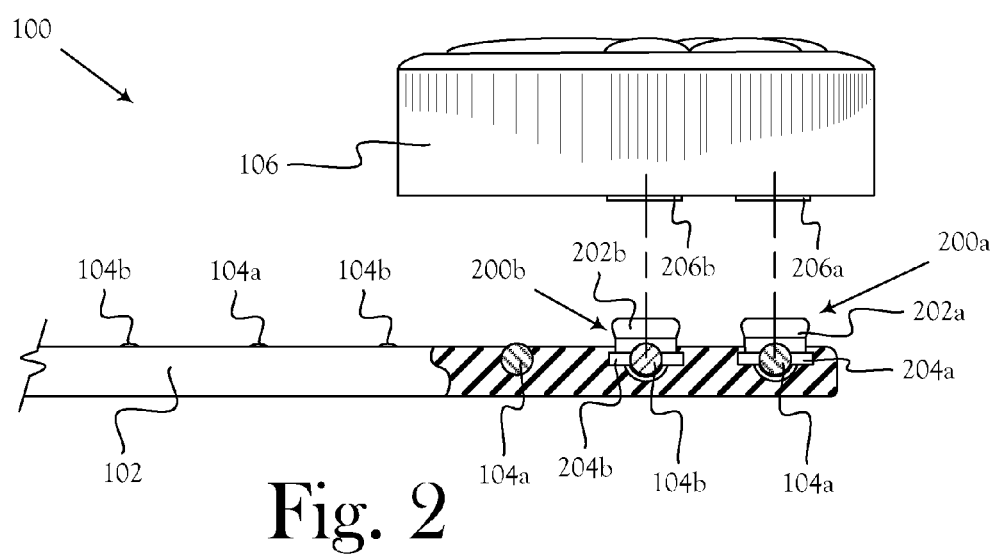
FIG. 2 illustrates, in partial section and exploded, region 2 of FIG. 1 showing one embodiment of a physical and electrical connection between the control unit and the mat of the animal deterrent mat.

FIG. 2 illustrates one embodiment of a releasable connection between the control unit 106 and the mat 102. The control unit 106 includes a housing carrying a control circuit that controls the operation of the animal deterrent mat 100. In the illustrated embodiment, snap fasteners provide a physical connection between the control unit 106 and the mat 102 and an electrical connection between the control unit 106 and the two conductors 104a, 104b. Each snap fastener includes a closure unit 200a, 200b and an attachment unit 206a, 206b. The illustrated closure units 200a, 200b each include a socket 202a, 202b extending out of the mat 102 and a terminal 204a, 204b connecting the closure unit 200a, 200b to one of the two conductors 104a, 104b. The illustrated attachment units 206a, 206b extending out of the housing of the control unit 106 each include a ring that securely receives the socket 202a, 202b and creates a releasable mechanical and electrical connection. In one embodiment, the closure unit 200a, 200b and the attachment unit 206a, 206b are fabricated from an electrically conductive material.

One skilled in the art will recognize other mechanical and electrical connections that may be used without departing from the scope and spirit of the present invention. While the embodiment shown and described references temporary fasteners, one skilled in the art will recognize that permanent fasteners may also be used to secure the control unit to the mat. In another embodiment, the control circuit is embedded within the mat. Further, although the embodiment shown and described uses a single connector for both mechanical and electrical connection, it will be appreciated by one skilled in the art that separate mechanical and electrical connectors may be used.

Figure 3:
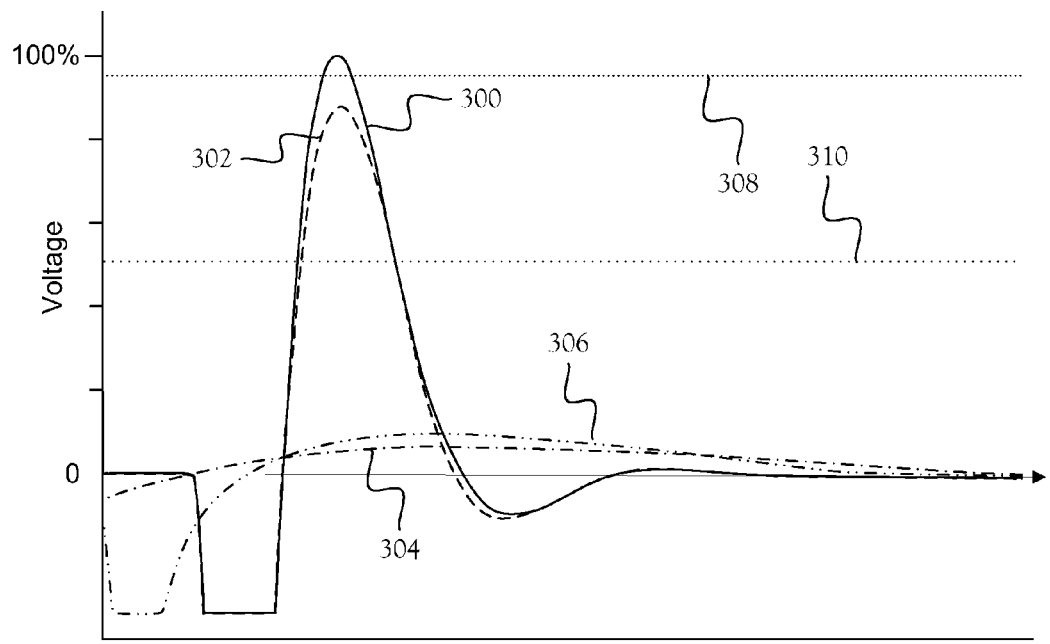
FIG. 3 plots the original detection pulse voltage and the attenuated voltages resulting from various objects engaging the mat.
Figure 4:
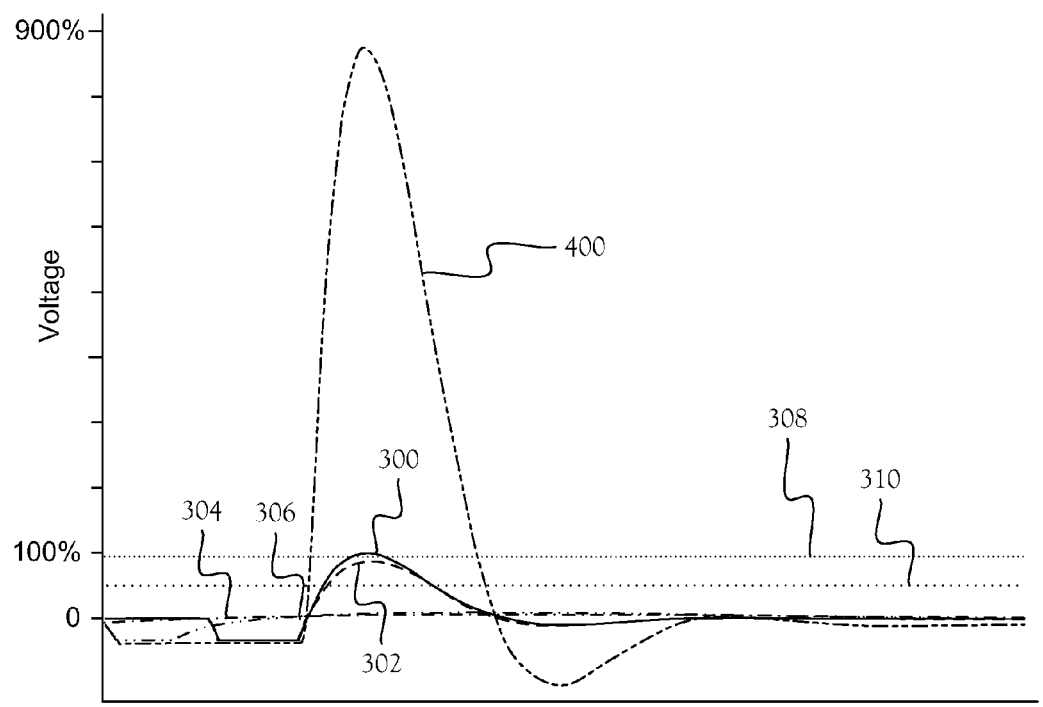
FIG. 4 plots of the original detection pulse voltage and the attenuated voltages resulting from various objects engaging the mat together with the deterrent stimulus voltage for comparison of the relative voltage levels.

FIGS. 3 and 4 illustrate the waveforms obtained using one embodiment of the present invention. In FIG. 3, a representative detection pulse 300 is shown by the solid line. The attenuated signal 302 occurring when an animal bridges the two conductors is shown by the dashed line. The attenuated signals occurring when a human hand 304 and human foot 306 create an electrical path between the two conductors are shown by the dashed, single dot line and the dashed, double dot line, respectively. A representative upper threshold 308 and lower threshold 310 are shown by the horizontal dotted lines. The characteristics of the detection pulse 300, such as the amplitude, width, and frequency, are selected to provide a measurable change when something makes a connection between the two conductors 104a, 104b without being noticeable by the thing making the connection. The frequency, or recurrence, of the detection pulse 300 also determines how often the control unit 106 checks for the presence of an object on the mat 102. In one embodiment, the detection pulse 300 has a magnitude of approximately 750 volts and a width of approximately 75 microseconds and recurs approximately four times per second. In one embodiment, the detection pulse 300 is produced and monitored at frequency sufficient to ensure that an animal cannot cross the mat 102 without being detected. There is no reason why continuous monitoring cannot be used; however, it is typically unnecessary and periodic monitoring allows for reduced power consumption. One skilled in the art will recognize that the specific values of the detection pulse described and the waveform illustrated herein are exemplary and that other suitable values and waveforms can be used.

When there is no load between the first conductor 104a and the second conductor 104b, the amplitude of the detection pulse 300 is considered normal. When a paw of a typical household pet, such as a dog or cat, makes contact between the first conductor 104a and the second conductor 104b, attenuation due to the change in load impedance at the secondary of transformer $T1_S$ reduces the amplitude of the detection pulse 300 by approximately 5-20% producing the waveform 302. Similarly, when a human makes contact with their hand between the first conductor 104a and the second conductor 104b, attenuation reduces the amplitude of the detection pulse 300 producing the attenuated waveform 304. When a human foot makes contact between the first conductor 104a and the second conductor 104b, attenuation reduces the amplitude of the detection pulse 300 producing the attenuated waveform 306. As can be seen from FIG. 3, testing has shown that the attenuation due to either a human hand or a human foot is greater than 90% of the detection pulse 300 amplitude with no load connecting the first conductor 104a and the second conductor 104b.

In FIG. 3, the upper threshold 308 represents a value between the amplitude of the detection pulse and the amplitude of the attenuated signal 302 occurring when an animal steps on the mat 102. By comparing the amplitude of the attenuated waveform 302, 304, 306 to the upper threshold 308, the control unit 106 can determine whether an animal has made contact with the mat 102. When the amplitude of the attenuated signal is below the upper threshold 308, which indicates that an animal has stepped onto the mat, the control unit 106 will issue a deterrent stimulus. However, when the attenuated signal is above the upper threshold 308, which indicates that nothing is on the mat 102 or, perhaps, an object producing less attenuation, such as a toy, a blanket, or a shoe is on the mat 102, no deterrent stimulus is generated. In one embodiment, the upper threshold 308 is set by sampling the detection pulse 300 with no object in contact with the mat 102 and fixing the upper threshold 308 as a percentage of the measured amplitude of the detection pulse 300. Other techniques for setting the upper threshold 308 will be understood and appreciated by one of ordinary skill in the art.

In another embodiment, the attenuated waveform 302, 304, 306 is also compared to a lower threshold 310 by the control unit 106. The lower threshold represents a value between the amplitude of the attenuated signal 302 occurring when an animal steps on the mat and the amplitude of the attenuated waveform when some other object producing greater attenuation, such as a human hand 304 or a human foot 306, is on the mat 102. When the attenuated signal is below the upper threshold 308 and above the lower threshold 310, the control unit 106 generates a deterrent stimulus. However, when the attenuated signal is below the lower threshold 310, no deterrent stimulus is generated. Thus, the lower threshold 310 prevents a deterrent from being applied to humans. As with the upper threshold 308, one skilled in the art will recognize the various techniques available to set the lower threshold 310. For example, one embodiment sets the lower threshold 310 by sampling the detection pulse 300 with no object on the mat 102 and fixing the lower threshold as a percentage of the measured amplitude of the detection pulse 300. In another embodiment, either or both of the upper threshold 308 and the lower threshold 310 are pre-programmed with typical, generalized values obtained through calculation or measurement.

In this manner, the range of objects receiving a deterrent stimulus can be controlled. By only producing a deterrent stimulus when a pet is in contact with the mat, a reduction of power consumption (i.e., longer battery life) will be realized. By detecting when an object other than a pet's paw is making contact with the mat and not producing the deterrent stimulus, humans are saved the discomfort of receiving the deterrent stimulus.

FIG. 4 includes the waveforms from FIG. 3 scaled relative to the amplitude of the deterrent pulse 400. As previously discussed, when the logic circuit 306 determines that an animal has made contact with the mat 102, a deterrent pulse 400 of significantly greater amplitude is generated. In the illustration of FIG. 4, the deterrent pulse 400 is a 75-microsecond, 7000-volt pulse generated to deter the animal from proceeding across the mat 102. By generating a series of deterrent pulses 400, the discomfort felt by the animal is increased compared to producing a single deterrent pulse. In other embodiments, the intensity of the deterrent is varied by changing the pulse width, the amplitude, the number of pulses, or the frequency of the pulses. As with the discussion of the detection pulse 300, one skilled in the art will recognize that the specific values of the detection pulse described and the waveform illustrated herein are exemplary and that other suitable values and waveforms can be used.

Figure 5:
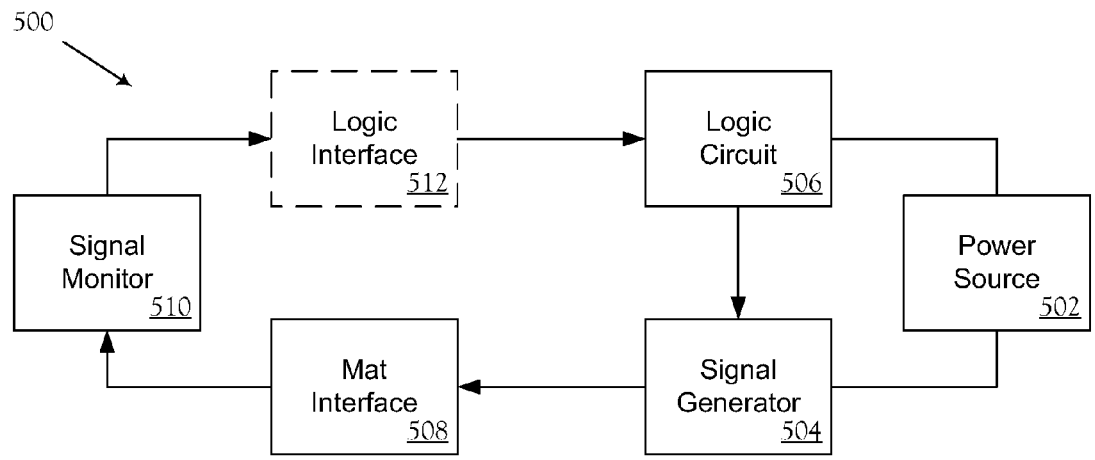
FIG. 5 is a block diagram of one embodiment of the control circuit of the animal deterrent mat.

FIG. 5 illustrates a block diagram of the control unit 106 of the animal deterrent mat 100. The control circuit 500 generally includes a dc power source 502, a signal generator 504, a logic circuit 506, a mat interface 508, a signal monitor 510, and an optional logic interface 512. The dc power source 502 provides power to operate the control circuit 500 and produce the deterrent stimuli. The signal generator 504 produces both the low level detection pulse 300 used to detect when an animal steps on the mat 102 and the deterrent stimulus 400 used to deter the animal from the area protected by the animal deterrent mat 100. The mat interface 508 provides an electrical connection to the conductors 104a, 104b carried by the mat 102. The signal monitor 510 collects the voltage across the mat interface 508 and provides it to the logic circuit 506 for processing, either indirectly through the logic interface 512 or directly. The optional logic interface 512 performs any necessary conversion, conditioning, or other adjustments to make the output of the signal monitor usable by the logic circuit 506.

The logic circuit 506 controls the operation of the animal deterrent mat 100, in general. More specifically, the logical circuit 506 provides various functions including activating the signal generator 504 to produce detection pulses 300 applied to the mat 102, comparing the level of the voltage present on the mat 102 with a reference to determine whether an animal has stepped on the mat 102, and activating the signal generator 504 to produce a deterrent stimulus 400 applied to the mat 102 when an animal steps on the mat 102. In one embodiment, the logic circuit 506 is digital and is implemented using a processor, controller, or other digital circuits/components that are capable of making the necessary comparisons and generating appropriate control signals. In another embodiment, the logic circuit 506 is analog and is implemented using comparators that drive the signal generator 504 to trigger the generation of the correction pulse or other analog circuits/components that are capable of making the necessary comparisons and generating appropriate control signals.

Figure 6:
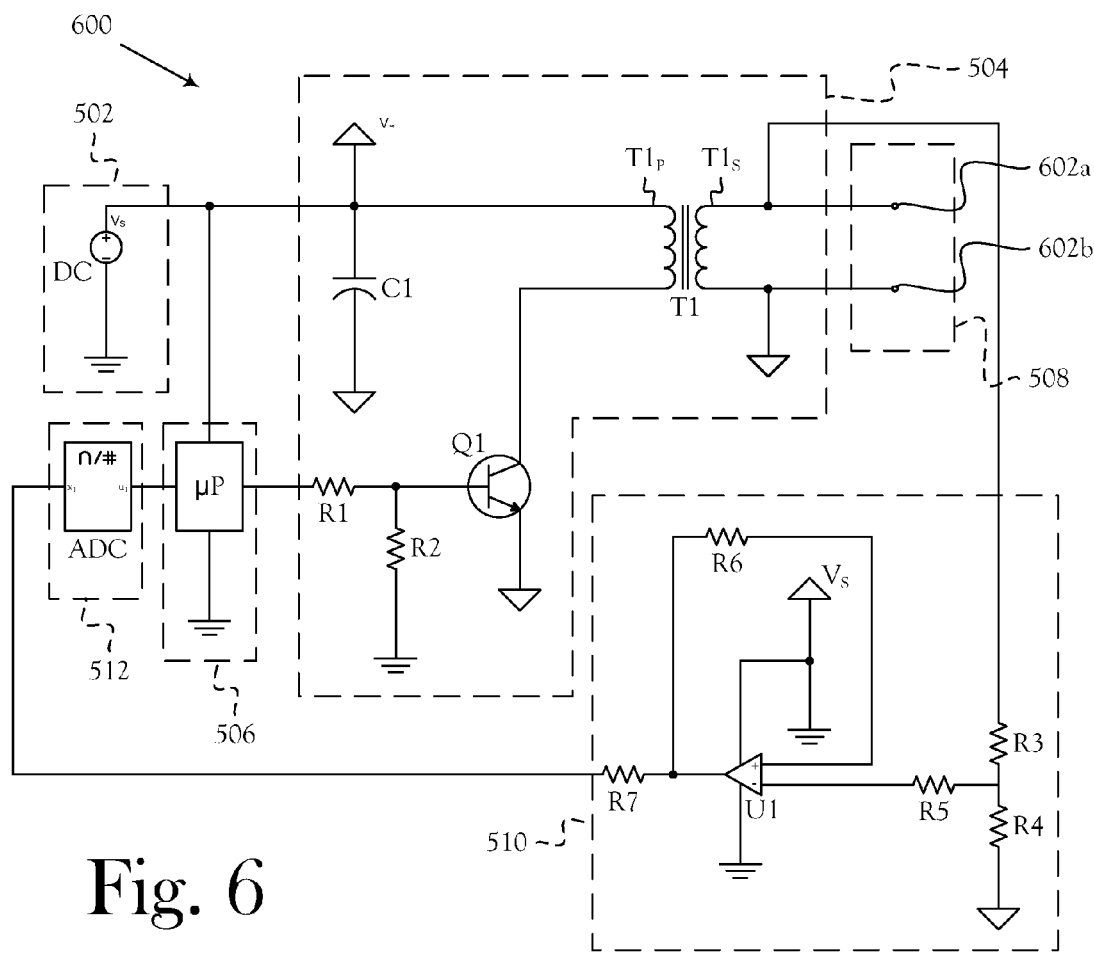
FIG. 6 is a schematic of one embodiment of the control circuit of the animal deterrent mat.

FIG. 6 illustrates a schematic of one embodiment the control unit 106. In the illustrated embodiment, the power source 502 is generalized as a dc power supply DC. One of ordinary skill in the art will recognize that the various mechanisms for providing the necessary power including the use of batteries or rectified ac power. In the illustrated embodiment, the signal generator 504 includes a transistor Q1 operating as a switch, and a transformer T1, together with the components (e.g., R1, R2, C1) for properly biasing the transistor Q1 and the transformer T1. The secondary of transformer $T1_S$ is in electrical communication with the connectors 602a, 602b, e.g., the snaps 206a, 206b of the mat interface 508 that connect to the corresponding connectors on the mat, e.g., the snaps 204a, 204b.

Turning on the transistor Q1 produces a low level dc voltage drop and allows a dc current to flow through the primary of the transformer $T1_P$, which creates a magnetic field and a corresponding output pulse at the secondary of the transformer $T1_S$. Subsequently, turning off the transistor Q1 eliminates the voltage drop and stops the dc current flow through the primary of the transformer $T1_P$, which causes the magnetic field to rapidly collapse. As a result, a large amplitude voltage is produced at the secondary of the transformer $T1_S$. By controlling the period of time that the transistor Q1 is turned on, i.e., the duty cycle of the transistor Q1, the magnitude of the magnetic field induced in the transformer T1 is controlled allowing the production of an output signal having a selected amplitude at the secondary of the transformer $T1_S$. When connected to the mat 102, the control unit 106 delivers the output voltage of the secondary to one of the conductors 104a in the mat 102 while the other conductor 104b remains at the common reference voltage, typically ground.

The logic circuit 506, which in the illustrated embodiment is a processor μP, monitors the amplitude of the detection pulse 300 through the signal monitor 510, which in the illustrated embodiment includes a voltage divider R3, R4 and a buffer amplifier U1, R5, R6, R7, and the logic interface 512, which in the illustrated embodiment is an analog-to-digital converter ADC. The voltage divider includes a large valued resistor R3 and a smaller valued resistor R4. The analog-to-digital converter ADC produces a digital representation of the analog magnitude of the voltage at the output of the signal monitor 510. The processor μP compares the digital representation of the voltage of the deterrent pulse 300 to the upper threshold 308 to determine if an animal (or other object causing sufficient attenuation of the detection pulse) has made contact with the mat 102, i.e., bridged the conductors 104a, 104b. As previously discussed, certain embodiments also employ a lower threshold 310. In these embodiments, the processor μP also compares the digital representation of the voltage to the lower threshold 310 to determine if the amplitude of the detection pulse 300 is too low to be caused by an animal making contact with the mat 102. Thus, if the processor μP determines that an animal has made contact with the mat 102, the processor μP adjusts its output to the signal generator 504 causing a deterrent pulse 400 to be generated and applied to the conductors 104a, 104b.

An animal deterrent mat with animal detection has been shown and described in the preceding description and figures. The animal deterrent mat includes a mat carrying electrically isolated conductors and a control circuit in communication with the conductors that generates and monitors a detection pulse to determine if an animal makes contact with the mat and a deterrent pulse to deter an animal from the area protected by the mat. The animal deterrent mat normally produces a low voltage detection pulse within the mat that is attenuated when an object comes in contact with the mat. This provides low power consumption operation under normal circumstances. The animal deterrent mat monitors the amplitude of the detection pulse. When the amplitude of the detection pulse falls below an upper threshold corresponding to the attenuation caused when an animal comes into contact with the mat, the animal deterrent mat alters the signal applied to the mat to the level of a deterrent pulse. The deterrent pulse has sufficient intensity to discourage an animal from remaining on or attempting to cross the mat. In one embodiment, the animal deterrent mat also uses a lower threshold and does not apply a deterrent stimulus when the amplitude of the deterrent pulse falls below the lower threshold. The lower threshold represents an attenuation level that exceeds the amount of attenuation caused when an animal makes contact with the mat, such as the attenuation caused by a human making contact with the mat. This permits the animal deterrent mat to further limit the situations in which deterrent stimulus is applied and generally avoids applying the deterrent stimulus to a human.

While the present invention has been illustrated by description of several embodiments and while the illustrative embodiments have been described in detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the scope or spirit of the general inventive concept.

Having described the aforementioned invention, what is claimed is:

1. An apparatus for discouraging an animal from an area, said apparatus comprising:
   a mat having a top surface, said mat fabricated from an electrically non-conductive material, said mat carrying a first conductor and a second conductor, said first conductor being electrically isolated from said second conductor, said first conductor and said second conductor being exposed at said top surface of said mat, said first conductor and said second conductor arranged so that the animal engaging said mat establishes an electrical connection between said first conductor and said second conductor;
   a signal generator in electrical communication with said first conductor and said second conductor, said signal generator adapted to produce a detection pulse and a deterrent pulse, said deterrent pulse being selected to have a deterrent effect when received by the animal, said detection pulse being substantially unnoticeable to an animal, said detection pulse having an amplitude;
   a signal monitor in electrical communication with said first conductor and said second conductor, said signal monitor producing an output corresponding to said detection pulse, said signal monitor output having an amplitude; and
   a logic circuit in communication with said signal monitor and said signal generator, said logic circuit comparing said signal monitor output to an upper threshold, said upper threshold being less than said detection pulse amplitude when said first conductor and said second conductor remain electrically isolated and greater than said detection pulse amplitude when an animal makes contact with both said first connector and said second connector, said logic circuit causing said signal generator to produce said deterrent pulse when said signal monitor output amplitude is less than said upper threshold.

2. The apparatus of claim 1 further comprising a lower threshold, said lower threshold being less than said detection pulse amplitude when an animal makes contact with both said first connector and said second connector and greater than said detection pulse amplitude when a human makes contact with both said first connector and said second connector, said logic circuit causing said signal generator to produce said deterrent pulse when said signal monitor output amplitude is less than said upper threshold and greater than said lower threshold.

3. The apparatus of claim 1 wherein said logic circuit does not cause said signal generator to produce said deterrent pulse when said signal monitor output amplitude is less than said lower threshold.

4. The apparatus of claim 1 wherein said first conductor and said second conductor are arranged in an alternating series of substantially concentric shapes.

5. The apparatus of claim 1 wherein said first conductor and said second conductor are arranged in an alternating series of substantially parallel lines.

6. The apparatus of claim 1 wherein said logic circuit comprises analog logic components including comparators.

7. The apparatus of claim 1 wherein said logic circuit comprises a processor and said signal monitor comprises a voltage divider.

8. The apparatus of claim 7 further comprising a logic interface between said signal monitor and said logic circuit, said logic interface comprising an analog-to-digital converter.

9. The apparatus of claim 1 further comprising a control unit housing, said control unit housing carrying said signal generator, said signal monitor, and said logic circuit.

10. The apparatus of claim 9 wherein said control unit housing is temporarily connected to said mat, said apparatus further comprising:
  a first releasable connector in electrical communication between said signal generator and said first conductor; and
  a second releasable connector in electrical communication between said signal generator and said second conductor.

11. The apparatus of claim 1 wherein said signal generator, said signal monitor, and said logic circuit are embedded in said mat.

12. The apparatus of claim 1 wherein logic circuit causes said detection pulse to be generated periodically at a selected frequency.

* * * * *